(12) United States Patent
Park

(10) Patent No.: US 9,027,516 B2
(45) Date of Patent: May 12, 2015

(54) DOMESTIC COMBINED HEAT AND POWER SYSTEM

(75) Inventor: Chang Kwon Park, Incheon (KR)

(73) Assignee: Kyungdong Navien Co., Ltd. (KR)

( * ) Notice: Subject to any disclaimer, the term of this patent is extended or adjusted under 35 U.S.C. 154(b) by 151 days.

(21) Appl. No.: 13/996,822

(22) PCT Filed: Jul. 19, 2011

(86) PCT No.: PCT/KR2011/005310
§ 371 (c)(1),
(2), (4) Date: Jun. 21, 2013

(87) PCT Pub. No.: WO2012/086891
PCT Pub. Date: Jun. 28, 2012

(65) Prior Publication Data
US 2013/0291809 A1    Nov. 7, 2013

(30) Foreign Application Priority Data
Dec. 24, 2010    (KR) .................. 10-2010-0135023

(51) Int. Cl.
*F01K 13/00*    (2006.01)
*F24H 8/00*    (2006.01)
*F24D 11/00*    (2006.01)
(Continued)

(52) U.S. Cl.
CPC ............... *F24H 8/00* (2013.01); *F24D 11/004* (2013.01); *F24D 12/02* (2013.01); *F24H 2240/00* (2013.01); *Y02E 20/14* (2013.01); *F24H 7/005* (2013.01); *Y02B 30/14* (2013.01)

(58) Field of Classification Search
USPC ............... 122/31.1, 406.1, 414, 20 R, 20 A; 60/676, 678, 784
See application file for complete search history.

(56) References Cited

U.S. PATENT DOCUMENTS 2,001,515 A * 5/1935 Barrow ........................ 165/47
3,460,524 A * 8/1969 Lazaridis .................. 126/110 R
(Continued)

FOREIGN PATENT DOCUMENTS

JP    2004-100990 A    4/2004
JP    2010-181049 A    8/2010
(Continued)

OTHER PUBLICATIONS

English language Abstract for KR 10-0418459 B1.
(Continued)

*Primary Examiner* — Gregory A Wilson
(74) *Attorney, Agent, or Firm* — Hershkovitz & Associates, PLLC; Abe Hershkovitz

(57) ABSTRACT

A domestic combined heat and power system including a power unit, a heat-storage tank which receives waste heat of the power unit for storing heat in direct water, and a main heat exchanger connected to the heat-storage tank, being heated by a burner so as to use the water as hot water. A waste-heat heat exchanger filled with a heat-transfer medium is installed between the power unit and the heat-storage tank such that a waste-heat pipe is arranged in the form of a coil at one side inside the waste-heat heat exchanger, and a heat-storage pipe of the heat-storage tank is arranged in the form of a coil at the other side. Waste heat of the power unit is indirectly heat exchanged to the heat-storage tank through the heat-transfer medium. Costs and waste of energy consumption are reduced, and there is sharing of functions that are duplicated across the heat-storage tank.

2 Claims, 2 Drawing Sheets

(51) Int. Cl.
*F24D 12/02* (2006.01)
*F24H 7/00* (2006.01)

(56) References Cited

U.S. PATENT DOCUMENTS

| | | | | |
|---|---|---|---|---|
| 4,418,651 A | * | 12/1983 | Wyatt | 122/31.1 |
| 4,687,491 A | * | 8/1987 | Latty | 44/301 |
| 4,821,682 A | * | 4/1989 | Waters | 122/20 A |
| 6,282,900 B1 | * | 9/2001 | Bell | 60/648 |
| 6,598,397 B2 | * | 7/2003 | Hanna et al. | 60/651 |
| 8,674,525 B2 | * | 3/2014 | Van Den Bossche et al. | 290/1 A |

FOREIGN PATENT DOCUMENTS

| | | |
|---|---|---|
| KR | 10-0418459 B1 | 2/2004 |
| KR | 10-2005-0064018 A | 6/2005 |
| KR | 10-2010-0128210 A | 12/2010 |
| KR | 20-2010-0011901 U | 12/2010 |

OTHER PUBLICATIONS

English language Abstract for JP 2010-181049 A.
English language Abstract for KR 10-2010-0128210 A.
English language Abstract for JP 2004-100990 A.
English language Abstract for KR 10-2005-0064018 A.
International Search Report mailed on Feb. 24, 2012.

* cited by examiner

DOMESTIC COMBINED HEAT AND POWER SYSTEM

TECHNICAL FIELD

The present invention relates to a domestic combined heat and power system, and more particularly, to a domestic combined heat and power system which improves efficiency while reducing a volume by sharing a heat-storage tank and an expansion tank, and has excellent compatibility with types of applied power systems.

BACKGROUND ART

In general, two heating methods are adopted in joint residential complexes such as apartment complexes; for example, one is an individual heating method in which an individual heater is used for each household, and the other is a central heating method in which hot water for heating and living uses is supplied from a center control.

The heating method of the heat demander, that is, apartment complexes, which adopts the centralized type heating method, is performed by heating water using fuel such as B-C oil, LNG, LPG, or the like, and intermittently providing heated water or vapor of 100° C. or higher as hot water to each household in the apartment complex 3 to 5 times a day.

In this centralized type heating method in the related art, because water or vapor is produced in a boiler, and the produced vapor is heat exchanged to high temperature water by a heat exchanger so as to be provided as hot water, it can be seen that a large number of boilers are used, and the heat exchange method, which exchanges vapor for hot water, causes a large amount of heat loss.

As a method for resolving the aforementioned drawback, a combined heat and power system having high efficiency energy use is suggested as an alternative.

The combined heat and power system is a total energy system that simultaneously produces electric power and heat from a single energy source, and generally operates an energy system in which a high temperature part is used as power, and a low temperature part is used as heat.

Among the combined heat and power systems, as illustrated in FIG. 1, a widely used type of combined heat and power system that is distributed for domestic use is configured to store heat subordinately generated from a power unit 10 in a heat-storage tank 12, and provide heat by heating using a boiler 14 when heat is required.

However, because the disclosed widely used combined heat and power system is configured so that waste heat of the power unit 10 is directly heat exchanged inside the heat-storage tank 12, it is difficult to dispose the system efficiently, and in addition, because an amount of heat is varied in accordance with a capacity of the power unit 10, pipes of a heat exchange part, which will be installed inside the heat-storage tank 12, need to be designed to have different diameters for each capacity of the power unit 10, and thereby versatility deteriorates, and there are many difficulties in terms of development.

In addition, the boiler 14, which is subsidiarily driven for an insufficient amount of heat to heat heating water or hot water, is formed in a structure provided with a burner 14a that is a heat source, a heat exchanger 14b configured to transfer heat of the burner 14a to heating water and/or hot water, and an expansion tank 14c configured to supplement water into heating piping or adjust pressure of the heating piping, but although the expansion tank 14c may be shared because the expansion tank 14 may perform a function similar to that of the heat-storage tank 12, the expansion tank 14c needs to be separately designed, so that there are drawbacks in that costs and energy are wasted.

Moreover, because the heat-storage tank 12 is formed in a hermetic structure in which piping performing a heat exchange function to produce hot water is installed, a shape of the heat-storage tank 12 is limited to a cylindrical shape for safety against internal pressure, and hereby, because there are many dead zones (dead spaces), an installation space may not be efficiently used, a volume is increased, a structure is complicated, and it is difficult to change the structure after design.

DISCLOSURE

Technical Problem

The present invention has been made in consideration of the above problem, and a solution is to provide a domestic combined heat and power system in which because a heat exchange structure between a power unit and a heat-storage tank is changed to an indirect heat exchange structure, it is not necessary to design the heat-storage tank again even though a capacity of the power unit is changed, and accordingly, costs and waste of energy consumption are reduced, and there is sharing of functions that are duplicated across the heat-storage tank and a boiler such that efficient system design is possible, variability of system is secured, compatibility is enhanced, and the system volume is reduced such that installation space may be more effectively used.

Technical Solution

As a means for achieving the aforementioned solution, the present invention provides a domestic combined heat and power system including a power unit, a heat-storage tank which receives waste heat of the power unit and stores heat in direct water separately flowing in, and a main heat exchanger which is connected to the heat-storage tank and is heated by a burner so as to use the water as hot water or heating water, in which a waste-heat heat exchanger filled with a heat-transfer medium is installed between the power unit and the heat-storage tank such that a waste-heat pipe of the power unit is arranged in the form of a coil at one side inside the waste-heat heat exchanger, and a heat-storage pipe of the heat-storage tank is arranged in the form of a coil at the other side, so that heat is indirectly exchanged from waste heat of the power unit to the heat-storage tank through the heat-transfer medium;

in which a heating-water supply pipe coming out from the heat-storage tank returns back into the heat-storage tank via a main heat exchanger, a third three-way valve, a heating load, a second three-way valve, and a first three-way valve, and another outlet of the first three-way valve is connected to the heating-water supply pipe that comes into the main heat exchanger, a hot-water-heating heat exchange coil coming out from another outlet of the third three-way valve is arranged so as to allow indirect heat exchange with a heat exchange coil of hot-water piping at a hot-water heat exchanger, and then connected to come into another inlet of the second three-way valve, and the hot-water piping coming out from the heat-storage tank is arranged so as to be indirectly heat exchanged with the hot-water-heating heat exchange coil at the hot-water heat exchanger, and then connected to a hot-water valve side.

Here, the heat-storage tank may be an open type tank having a rectangular parallelepiped shape.

Advantageous Effects

According to the present invention, since a heat-exchange method for the power unit and the heat-storage tank is changed into an indirect heat-exchange method, costs and waste of energy consumption are reduced, and there is sharing of functions that are duplicated across the heat-storage tank and a boiler such that efficient system design is possible, variability and compatibility are enhanced, and the system volume is reduced such that installation space may be more effectively used.

BEST MODE

Hereinafter, an exemplary embodiment according to the present invention will be described in more detail with reference to the accompanying drawings.

Figure 1:
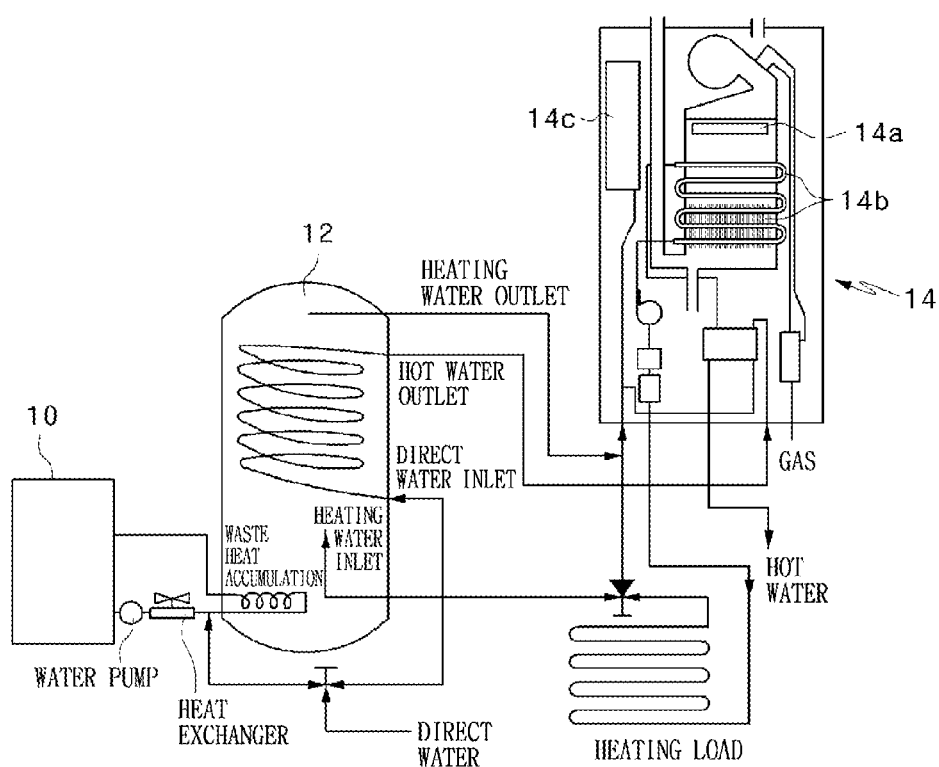
FIG. 1 is a schematic block diagram illustrating a widely used domestic combined heat and power system according to the related art.
Figure 2:
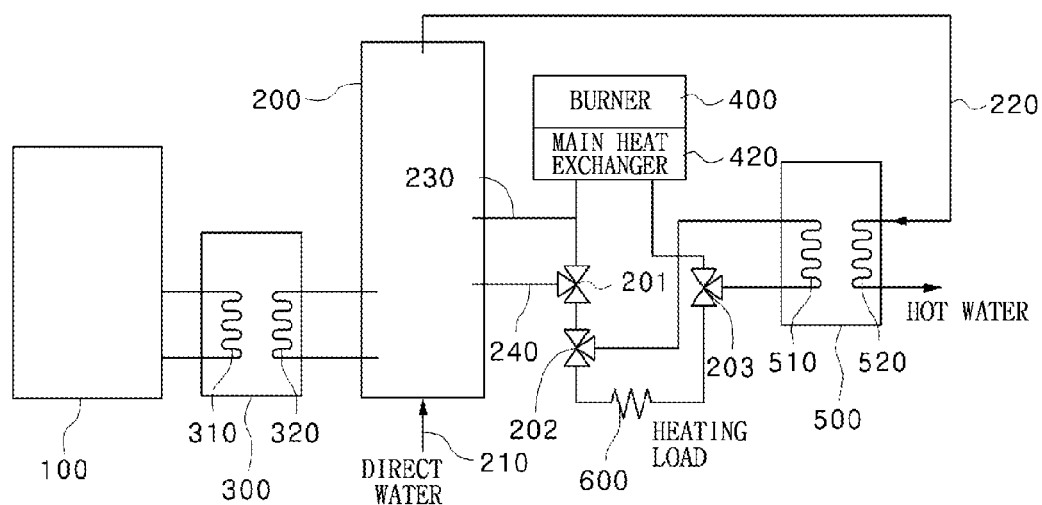
FIG. 2 is a schematic block diagram illustrating a domestic combined heat and power system according to the present invention.

FIG. 2 is a schematic block diagram illustrating a domestic combined heat and power system according to the present invention.

As illustrated in FIG. 2, a domestic combined heat and power system according to the present invention is configured such that a power unit 100 and a heat-storage tank 200 are indirectly heat exchanged through a waste-heat heat exchanger 300, and in addition, a function of an expansion tank, which is one of the constituent components of an auxiliary boiler, is incorporated into (shared by) the heat-storage tank 200 such that the number of components of the auxiliary boiler is reduced to simplify a structure, reduce a volume, and implement a structurally efficient system.

In a state in which the waste-heat heat exchanger 300 is filled therein with a heat-transfer medium, a waste-heat pipe 310 coming out from the power unit 100 is arranged in the form of a coil at one side of the waste-heat heat exchanger 300, and a heat-storage pipe 320 through which the heat-transfer medium (for example, water) filled in the heat-storage tank 200 flows is arranged in the form of a coil at the other side, so that when heat emitted from the waste-heat pipe 310 heats the heat-transfer medium in the waste-heat heat exchanger 300, a heat exchange is performed in a form in which heat is transferred from the heated heat-transfer medium to a heat-transfer medium inside the heat-storage pipe 320 through which a heat-transfer medium having a relatively low temperature flows, and a temperature of the heat-transfer medium inside the heat-storage pipe 320 is raised.

In other words, because the heat-storage tank 200 has a structure in which the heat-storage tank 200 is heated by receiving waste heat of the power unit 100 in an indirect heat exchange method through the waste-heat heat exchanger 300 and through different loops, even though a designed capacity of the power unit 100 is varied, it is not necessary to change a configuration of a heat storage part, such as changing the heat-storage tank 200, preferably a diameter of a heat-storage pipe 320, in accordance with the varied heat capacity of the power unit 100, thereby improving versatility and securing many merits in terms of design.

In addition, as a function of the expansion tank, which was included in the existing auxiliary boiler, is incorporated into the heat-storage tank 200, the present invention does not require the entire configuration of the auxiliary boiler, but the configuration is changed to a structure in which only a burner 400, a main heat exchanger 420, and a hot-water heat exchanger 500 for heating hot water need to be designed.

Hot-water piping 220 may be arranged by directly coming out from the heat-storage tank 200, and it is more preferred that the hot-water piping 220 passes through the hot-water heat exchanger 500 in order to supplement heat.

That is, it is preferred that the hot-water heat exchanger 500 is further provided in order to additionally heat hot water coming out from the heat-storage tank 200 before the hot water is supplied to a user through a hot water valve, and it is more preferred that the hot-water heat exchanger 500 is designed to be heat exchanged using heating water that is heat exchanged through the main heat exchanger 420.

In this case, a hot-water-heating heat exchange coil 510 in which a heating-water pipe coming out in a state of being heated by receiving heat from the main heat exchanger 420 that is formed in the form of a coil is installed at one side inside the hot-water heat exchanger 500, a hot-water-piping heat exchange coil 520 in which the hot-water piping 220 coming out from the heat-storage tank 200 that is arranged in the form of a coil is installed at the other side so as to correspond to the hot-water-heating heat exchange coil 510, and a heat-transfer medium is filled between the hot-water-heating heat exchange coil 510 and the hot-water-piping heat exchange coil 520 inside the hot-water heat exchanger 500, so that heat emitted from the hot-water-heating heat exchange coil 510 heats the heat-transfer medium inside the hot-water heat exchanger 500, and the again heated heat-transfer medium transfers heat to hot water that flows through the hot-water-piping heat exchange coil 520, thereby heating the hot water.

Accordingly, in a case in which the hot water has a sufficient temperature at the time of using the hot water, the hot water coming out from the heat-storage tank 200 can be used without operating the burner 400, and in a case in which a temperature of the hot water is low, the burner 400 is operated, and the hot water is used in a state heated by indirectly receiving heat from the hot-water-heating heat exchange coil 510.

Therefore, heat loss is minimized, and a very efficient heat exchange structure may be implemented.

Meanwhile, it is preferred that a power of the power unit 100 is designed to be operated by a drive source driven by an internal combustion engine, an external combustion engine, a fuel cell, or the like, which is used in the art that has been well known.

Therefore, because waste heat of the power unit 100 is transferred to the heat-storage tank 200 in a form in which the heat is indirectly heat exchanged through the waste-heat heat exchanger 300, a change in design of the heat-storage tank 200 itself is not required regardless of a type or a capacity of the power unit 100, and in a case in which it is necessary to change the design of the heat-storage tank 200, since only a type of the heat-transfer medium inside the waste-heat heat exchanger 300 needs to be changed, costs may be reduced, an installation location is not limited, and a volume of equipment may also be reduced.

Direct water piping 210 through which direct water flows in is connected to a lower side of the heat-storage tank 200, hot-water piping 220 is connected to an upper side to allow hot water to be discharged, and a heating-water supply pipe 230 for supplying heating water, and a heating-water return pipe 240, to which water is returned back after passing through a heating load 600, are connected to the other side.

Moreover, as described above, the hot-water piping 220 is configured to be connected to the hot-water heat exchanger 500 so as to be heat exchanged, and then supply hot water.

The heating water-supply pipe 230 is arranged to one side of the main heat exchanger 420, piping coming out from the other side of the main heat exchanger 420 is configured to selectively supply water to the heating load 600 or the hot-water heat exchanger 500 through a third three-way valve 203, and piping is arranged so that heating water passing through the heating load 600 circulates to a first three-way valve 201 through a second three-way valve 202, and then circulates from the first three-way valve 201 to the heat-storage tank 200 or the main heat exchanger 420.

Piping connected from the third three-way valve 203 to the hot-water heat exchanger 500 is connected to the hot-water-heating heat exchange coil 510 of the hot-water heat exchanger 500, and one side inlet of the second three-way valve 202 is connected to the other end of the hot-water-heating heat exchange coil 510 such that heating water for heating hot water may be circulated.

By the configuration as described above, water stored in the heat-storage tank 200 may be easily used by selecting the water as the hot water, the heating water, or the heat-transfer medium for heating the hot water in accordance with utilization of water.

As such, because the heat-storage tank 200, which uses waste heat of the power unit 100, performs an indirect heat exchange method with the heat-transfer medium of the power unit 100 instead of an direct heat exchange method, it is not necessary to configure the heat-storage tank 200 as a hermetic type, but the heat-storage tank 200 may be configured as an open type, so that the heat-storage tank 200 is allowed to have a rectangular parallelepiped shape, thereby minimizing the dead zone(dead space), which is present when the heat-storage tank 200 has a cylindrical shape, and accordingly, there is a benefit in that installation space may be more effectively used.

The present invention having the above structure has an operational relationship as described below.

First, heat subordinately generated from the power unit 100 when the power unit 100 produces electricity is indirectly heat exchanged through the waste-heat heat exchanger 300, and heats direct water, which has flown into the heat-storage tank 200 through the direct water piping 210 up to a predetermined temperature, and the heat is stored in the direct water.

A part of the direct water, which is maintained in the heat-storage tank 200 in a state in which heat is stored therein, is utilized as hot water or heating water, and for example, in a case of using the hot water, the hot water in a state in which a temperature is raised may be directly supplied through the hot-water piping 220 via the heat-storage tank 200 without operating the burner 400. In addition, in a case in which a temperature is low, flow paths of the first three-way valve 201, the second three-way valve 202, and the third three-way valve 203 are controlled such that heating water in the hot-water-heating heat exchange coil 510 circulates to the main heat exchanger 420, and the burner 400 is operated such that the hot water in the hot-water piping 220 is indirectly heat exchanged through the hot-water heat exchanger 500, and the hot water is supplied in a state in which a temperature thereof is raised up to an appropriate temperature.

As such, when at the time of operating the burner 400, heat is transferred through the main heat exchanger 420, the heat allows heating water to be circulated, or provides a heat source to the hot-water heat exchanger 500, in accordance with opening directions of the first to third three-way valves 201 to 203.

That is, when the flow path of the third three-way valve 203 is controlled to be from the main heat exchanger 420 toward the heating load 600, the heat stored water coming out through the heating-water supply pipe 230 is heat exchanged via the main heat exchanger 420, and then is supplied to the heating load 600 through the third three-way valve 203 so as to be circulated to be used to heat a room, and in addition, when the flow path of the third three-way valve 203 is controlled to be from the main heat exchanger 420 toward the hot-water heat exchanger 500, the heating water passing through the main heat exchanger 420 is circulated via the hot-water-heating heat exchange coil 510 of the hot-water heat exchanger 500, and used to heat the hot water in the hot-water piping 220.

DESCRIPTION OF MAIN REFERENCE NUMERALS OF DRAWINGS

100: Power unit
200: Heat-storage tank
201: First three-way valve
202: Second three-way valve
203: Third three-way valve
210: Direct water piping
220: Hot-water piping
230: Heating-water supply pipe
240: Heating-water return pipe
300: Waste-heat heat exchanger
310: Waste-heat pipe
320: Heat-storage pipe
400: Burner
420: Main heat exchanger
500: Hot-water heat exchanger
510: Hot-water-heating heat exchange coil
520: Hot-water-piping heat exchange coil

The invention claimed is:

1. A domestic combined heat and power system comprising a power unit, a heat-storage tank which receives waste heat of the power unit and stores heat in direct water separately flowing in, and a main heat exchanger which is connected to the heat-storage tank and is heated by a burner so as to use water as hot water or heating water,
wherein a waste-heat heat exchanger filled with a heat-transfer medium is installed between the power unit and the heat-storage tank, such that a waste-heat pipe of the power unit is arranged in the form of a coil at one side inside the waste-heat heat exchanger, and a heat-storage pipe of the heat-storage tank is arranged in the form of a coil at the other side, so that heat is indirectly exchanged from waste heat of the power unit to the heat-storage tank through the heat-transfer medium;
a heating-water supply pipe coming out from the heat-storage tank comes back into the heat-storage tank via a main heat exchanger, a third three-way valve, a heating load, a second three-way valve, and a first three-way valve, another outlet of the first three-way valve is connected to the heating-water supply pipe that comes into the main heat exchanger, and a hot-water-heating heat exchange coil coming out from another outlet of the third three-way valve is arranged so as to allow indirect heat exchange with a heat exchange coil of hot-water piping at a hot-water heat exchanger, and then connected so as to come into another inlet of the second three-way valve, and the hot-water piping coming out from the heat-storage tank is arranged so as to be indirectly heat exchanged with the hot-water-heating heat exchange coil at the hot-water heat exchanger, and then connected to a hot-water valve side.

2. The domestic combined heat and power system of claim 1, wherein the heat-storage tank is an open type having a rectangular parallelepiped shape.

* * * * *